United States Patent
Bhuta et al.

(10) Patent No.: US 11,295,471 B1
(45) Date of Patent: Apr. 5, 2022

(54) CAMERA-BASED PALLET PLACEMENT DETECTION AND NOTIFICATION

(71) Applicant: Amazon Technologies, Inc., Seattle, WA (US)

(72) Inventors: Rishi Shailesh Bhuta, Seattle, WA (US); Angela Wang, Seattle, WA (US); Nikhila Krishnan, Seattle, WA (US); Chih-hung Cheng, Mercer Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 132 days.

(21) Appl. No.: 16/710,650

(22) Filed: Dec. 11, 2019

(51) Int. Cl.
 *G06T 7/73* (2017.01)
 *G06T 7/13* (2017.01)
 *B65G 43/00* (2006.01)
 *H04N 7/18* (2006.01)

(52) U.S. Cl.
 CPC .......... *G06T 7/73* (2017.01); *B65G 43/00* (2013.01); *G06T 7/13* (2017.01); *H04N 7/183* (2013.01); *B65G 2203/041* (2013.01); *G06T 2207/20061* (2013.01)

(58) Field of Classification Search
 CPC ..... G06T 7/73; G06T 7/13; G06T 2207/20061; B65G 43/00; B65G 2203/041; H04N 7/183
 See application file for complete search history.

(56) References Cited

U.S. PATENT DOCUMENTS

| | | | | |
|---|---|---|---|---|
| 10,901,404 | B2 * | 1/2021 | Stadie | B65G 1/065 |
| 11,007,648 | B2 * | 5/2021 | Wertenberger | B25J 9/1628 |
| 2015/0347840 | A1 * | 12/2015 | Iida | G05D 1/0225 382/103 |
| 2018/0373950 | A1 * | 12/2018 | Gong | G06T 7/11 |
| 2020/0078941 | A1 * | 3/2020 | Oka | B25J 9/1666 |
| 2020/0310442 | A1 * | 10/2020 | Halder | G05D 1/028 |

* cited by examiner

*Primary Examiner* — Shefali D Goradia
(74) *Attorney, Agent, or Firm* — Thomas Horstemeyer, LLP

(57) ABSTRACT

Aspects of camera-based pallet placement detection and notification are described. An image is captured using a camera device. The image includes a pallet placement region within a field of view of a camera device. A pallet placement is detected by determining at least one orthogonal intersection between a plurality of position lines identified from the image. A user interface provides the detected pallet position to facilitate corrective measures.

20 Claims, 11 Drawing Sheets

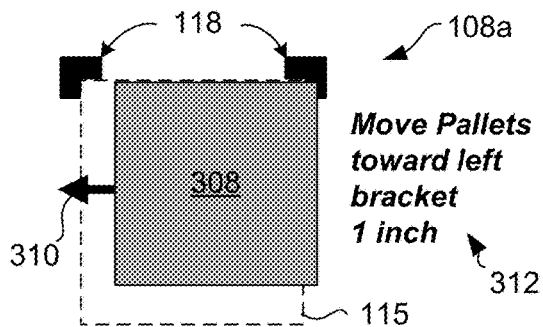
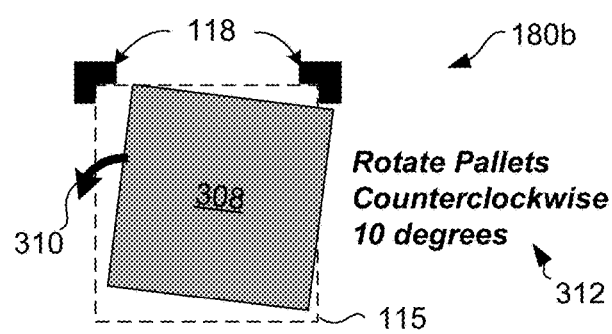
*FIG. 3A*  *FIG. 3B*
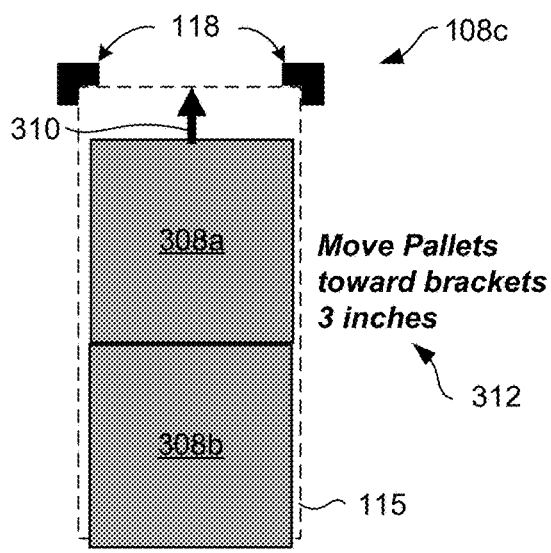
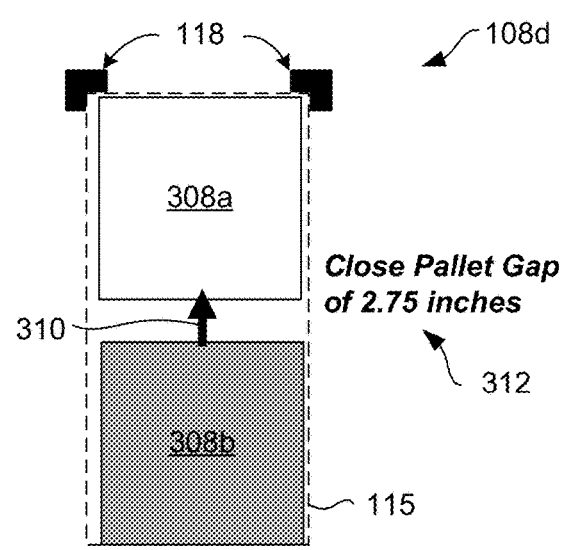
*FIG. 3C*  *FIG. 3D*
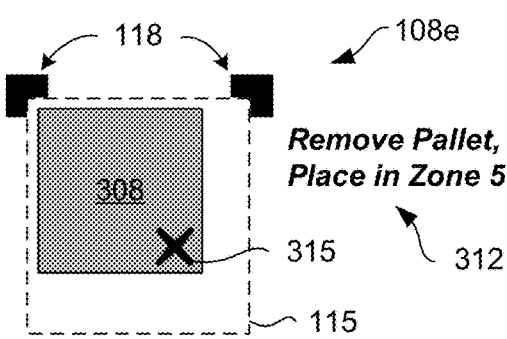
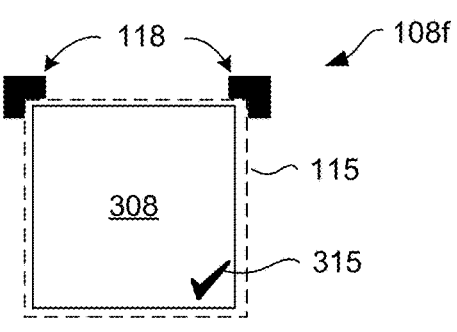
*FIG. 3E*  *FIG. 3F*

CAMERA-BASED PALLET PLACEMENT DETECTION AND NOTIFICATION

BACKGROUND

Automated guided vehicles (AGVs) can pick up or drop pallets in pallet buffers and other zones where palleted inventory can be temporarily or otherwise stored. These zones can exist in inventory receive centers, fulfillment centers, inbound cross dock centers, sortation centers, as well as other distribution centers, warehouses, and other facilities. For example, a pallet buffer within a fulfillment center can be used as a temporary holding space for pallets that hold inventory. In some fulfillment centers, the pallets can be placed in targeted areas of the pallet buffer zone using powered industrial truck (PIT) equipment. The pallets can be later retrieved and moved using AGVs. However, inaccurately placed pallets can cause AGV failures. If a pallet is misplaced, the pallet can obstruct a path of the AGV, the AGV can fail to engage a pallet with its forks, or the AGV can fail to detect the pallet.

BRIEF DESCRIPTION OF THE DRAWINGS

Aspects of the present disclosure can be better understood with reference to the following drawings. It is noted that the elements in the drawings are not necessarily drawn to scale, with emphasis instead being placed upon clearly illustrating the principles of the embodiments. In the drawings, like reference numerals designate like or corresponding, but not necessarily the same, elements throughout the several views.

FIGS. 3A-3F illustrate examples of user interface elements generated by a pallet placement system according to various aspects of the embodiments of the present disclosure.

DETAILED DESCRIPTION

As outlined above, pallet buffers can include zones where automated guided vehicles (AGVs) and powered industrial truck (PIT) equipment can interact with pallets. Inaccurately placed pallets can cause AGV failures. This disclosure describes aspects of camera-based pallet placement detection and notification. The aspects discussed can prevent AGV failures and increase the efficiency of using AGVs as well as manual PIT equipment. For example, a pallet placement system can detect pallet placement and provide real-time or near real-time placement status notifications, along with corrective instructions for improperly placed pallets.

Figure 1A:
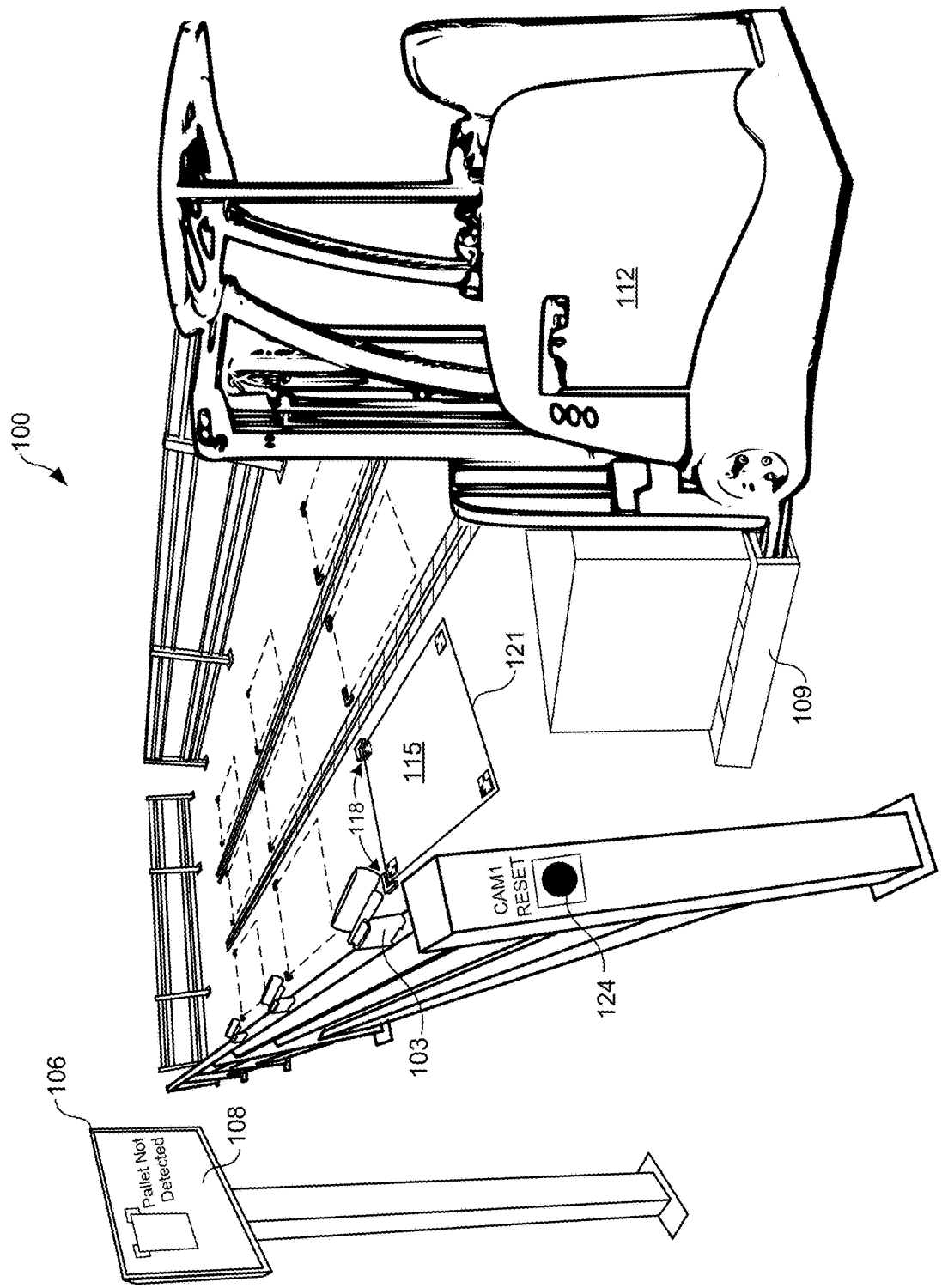
FIG. 1A illustrates an example pallet buffer with a pallet placement system according to various aspects of the embodiments of the present disclosure.

FIG. 1A shows an example pallet placement system 100 for a pallet buffer. The pallet placement system 100 can include cameras 103, a computing environment, and a display device 106, among other components. The display device 106 can render a user interface 108. The computing environment is further described below with reference to FIG. 1B. The pallet buffer shown in FIG. 1 can be used as a temporary holding space for pallets including the pallet 109. PIT equipment 112 can be used to place the pallet 109 in a pallet placement region, such as the pallet placement region 115 identified in FIG. 1, relative to a set of backing brackets 118, for example. Ideally, the pallet 109 should be placed precisely within a pallet placement region 115 in order to prevent AGV errors when interacting with the pallet 109. For example, the pallet placement region 115 can be determined based on a location of the backing brackets 118, an expected size of the pallet 109, and a placement tolerance, among other factors. The placement tolerance can be determined based on operational parameters of an AGV or type of AGV that can pick up the pallet 109, once placed in the pallet placement region 115.

The pallet placement system 100 can ensure proper placement of the pallet 109 within the pallet placement region 115. For example, a camera 103 can monitor the pallet placement region 115 to detect placement of the pallet 109. The pallet placement system 100 can identify the detected pallet position in the user interface 108 rendered for display on the display device 106. While the camera 103 is shown attached to a railing of the pallet buffer, and with a particular orientation in the example, the camera 103 can be placed in any suitable location. In a preferred location, at least two sides of the pallet and pallet placement region 115 are within a field of view of the camera 103 during placement. For example, the camera 103 can be positioned on a mounting bracket stand outside the pallet buffer, within the pallet buffer, on an overhead mounting bracket, or any other suitable position.

The display device 106 can be positioned so that an operator of the PIT equipment 112 can view the detected pallet position during or soon after placement of the pallet 109 over the pallet placement region 115. For example, while the display device 106 is illustrated as being positioned on a mounting bracket stand outside of the pallet buffer, the display device 106 can also be positioned on a mounting bracket stand within the pallet buffer, an overhead mounting bracket, or any other position. While the display device 106 is shown as a permanent or semi-permanent fixture in the facility in FIG. 1, the display device 106 can also be embodied as temporary and mobile devices affixed to the pallet buffer or PIT equipment 112, as well as the client devices 109 or other user devices. The pallet placement system 100 can also indicate corrective actions that describe how to correct unacceptable placements of the pallet 109. The pallet placement system 100 can also provide an indication that the detected pallet position is acceptable. If no pallet is detected, the pallet placement system 100 can also provide an indication that the pallet is undetected in the pallet placement region 115.

The pallet placement region 115 can be calibrated or recalibrated by placing a pallet calibration target 121 in the proper or expected position of the pallet placement region 115. The pallet calibration target 121 can include a number of fiducials. While a calibration target 121 can include multiple fiducials placed on a single card, poster, or other single object, the calibration target 121 can alternatively include separate fiducials placed to form the target. The camera 103 can capture an image of the fiducials, and the pallet placement system 100 can define the pallet placement region 115 based on the positions of the fiducials, as described in further detail below. The pallet calibration target 121 can be designed to be easily stored and quickly deployed for calibration of the pallet placement system 100. For example, the pallet calibration target 121 can be designed to fit precisely within the set of backing brackets 118. Once placed, a physical actuator or button 124 of the pallet placement system 100 can be depressed or activated to initiate calibration of the pallet placement region 115, among other pallet placement regions. The button 124 can be located nearby or within the pallet buffer. The button 124 can also refer to a user interface element that can be activated through a user interface 108. For example, the display device 106 can include a touch display, and a user interface button can be activated using the touch display. Alternatively, a user interface button can be activated through a user interface 108 on a phone device, a personal computing device, a tablet device, or another computing device. Once the pallet placement region 115 is calibrated, the pallet calibration target 121 can then be removed from the area. While the calibration target 121 can be a removable target, the calibration target 121 can also include permanent or semi-permanent durable fiducials that are affixed or incorporated as a fixture of the facility floor. A durable calibration target 121 can be incorporated into concrete, tile, other flooring materials, and other durable materials. These and other aspects of the embodiments are described in further detail below.

Figure 1B:
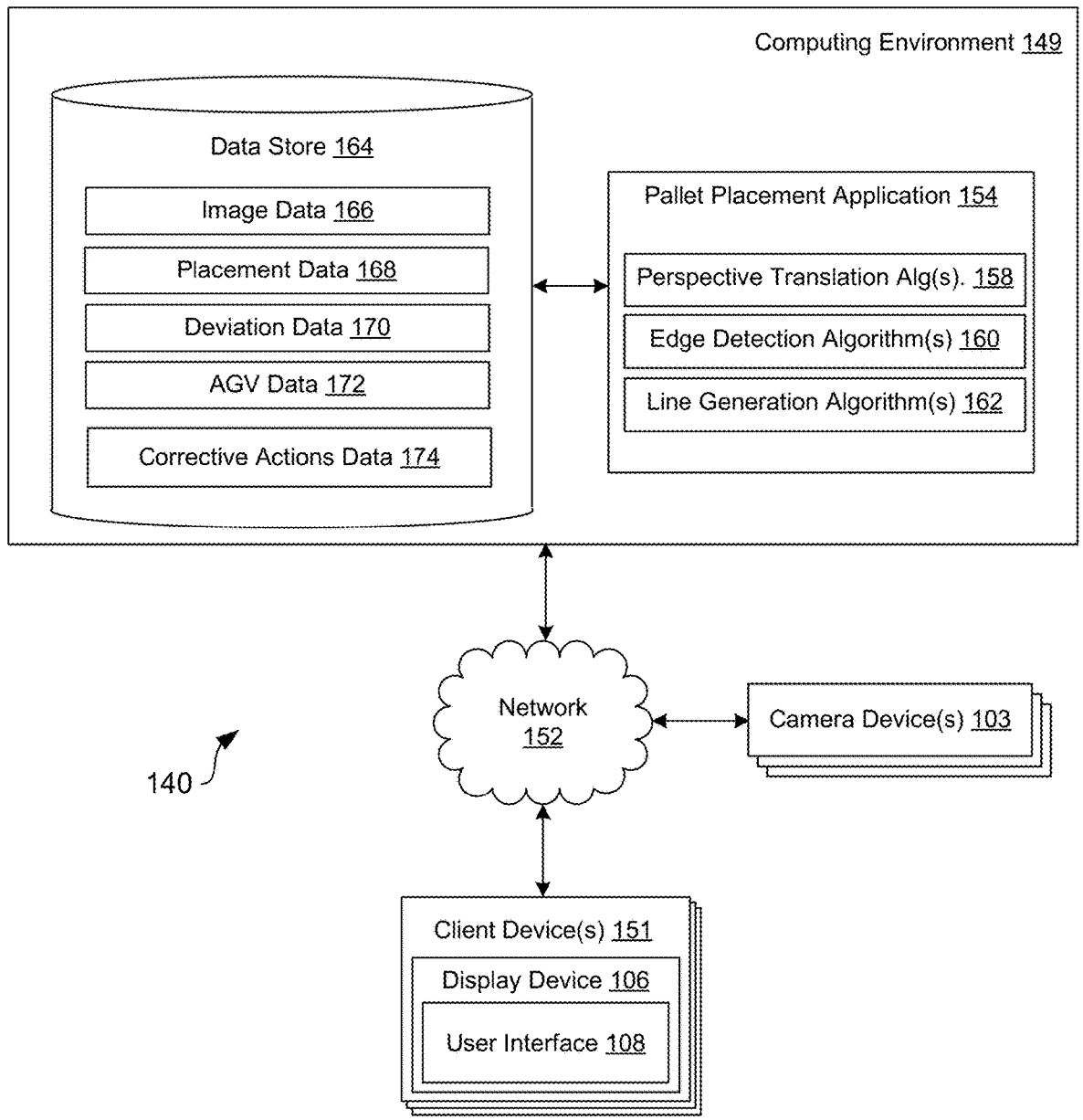
FIG. 1B illustrates an example networked environment of a pallet placement system according to various aspects of the embodiments of the present disclosure.

With reference to FIG. 1B, shown is a networked environment 140 of the pallet placement system 100 shown in FIG. 1A, according to various embodiments. The networked environment 140 includes a computing environment 149, one or more camera device(s) 103, and one or more client device(s) 151, which are in data communication with each other via a network 152. The network 152 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 149 may comprise, for example, a server computer or any other system providing computing capability. Alternatively, the computing environment 149 may employ a plurality of computing devices that may be arranged, for example, in one or more server banks or computer banks or other arrangements. Such computing devices may be located in a single installation or may be distributed among many different geographical locations. For example, the computing environment 149 may include a plurality of computing devices that together may comprise a hosted computing resource, a grid computing resource, and/or any other distributed computing arrangement. In some cases, the computing environment 149 may correspond to an elastic computing resource where the allotted capacity of processing, network, storage, or other computing-related resources may vary over time.

Various application components and/or other functionality may be executed in the computing environment 149 according to various embodiments. Also, data 164 may be stored in one or more memory or data store devices and be accessible to the computing environment 149. The application components can be executed in the computing environment 149. In the example shown in FIG. 1B, the application components include a pallet placement application 154, among others. The pallet placement application 154 includes a perspective translation algorithm 158, an edge detection algorithm 160, and a line generation algorithm 162, among other applications, services, processes, systems, engines, or functionality not discussed in detail herein.

The pallet placement application 154 can invoke one or more of the perspective translation algorithm 158, edge detection algorithm 160, and line generation algorithm 162 in conjunction with the data 164 to generate the user interface 108 for display on the display device 106. In some cases, the display device 106 can be a display of a client device 151. The pallet placement application 154 can transmit data for rendering the user interface 108 on the display device 106, or otherwise cause the user interface 108 to be rendered for display. For example, the client device 151 can access the pallet placement application 154 as a network service and render the user interface 108 for display on the display device 106.

The data 165 can include, for example, image data 166, placement data 168, deviation data 170, AGV data 172, corrective actions data 174, and potentially other data. The image data 166 can include videos, still images, frames of videos, and other images captured by the camera device(s) 103. The placement data 168 can include detected placement information that is generated by the pallet placement application 154 based on the image data 166. The placement data 168 can include current placement information and a history of the placement information for a number of different pallet placement regions, such as the pallet placement region 115 shown in FIG. 1A, among others. The placement data 168 can also include sizes, locations, and other information for the pallet placement regions. The deviation data 170 can include calculations of deviations between the pallet placement regions and the detected pallet placements.

The AGV data 172 can include information and parameters related to AGVs that pick up pallets from the pallet placement regions. For example, the AGV data 172 can include fork length, sensor location, error condition, and other information for an AGV. An AGV or type of AGV can be associated with a particular pallet placement region, such as the pallet placement region 115. The AGV data 172 can be referenced by the pallet placement application 154 in order to generate the appropriate size and shape of the pallet placement region 115, for example.

Corrective actions data 174 can include data or instructions for how to correct a poorly-placed pallet. For example, the corrective actions data 174 can identify a particular deviation between an expected placement of the pallet 109 within the pallet placement region 115, for example, and a detected placement of the pallet 109. Corrective actions 174 can include graphical direction indicators and textual descriptions of how to correct a number of different types of deviations. The pallet placement application 154 can identify a corrective action 174 based on a detected deviation, and can generate the user interface 108 to include the identified corrective action 174.

The camera device 103 can include a video camera, a still image camera, or another optical capture device. The camera device 103 can include pan-tilt-zoom (PTZ) capabilities that can be controlled through the user interface 108 of the client device 151, for example, among other devices. PTZ settings, focal length, optical center, and other camera parameters that can be used to correct for lens distortion can be stored in association with the pallet placement region 115, among others. The camera device 103 can be standalone device, or a component of the client device 151. The camera device 103 can include a wired or wireless data connection to the network 152. The camera device 103 can capture videos, still images, and other images, and transmit the image data 166 to the computing environment 149.

The client device 151 is representative of a plurality of client devices that may be coupled to the network 152. The client device 151 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 151 may include a display device 106. The display device 106 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 151 may be configured to execute various applications such as a client application and/or other applications. The client application may be executed in the client device 151, for example, to access network content served up by the computing environment 149 and/or other servers, thereby rendering the user interface 108 on the display 106. To this end, the client application may comprise, for example, a browser, a dedicated application, etc., and the user interface 108 may comprise a network page, an application screen, etc. The client device 151 may be configured to execute applications beyond the client application such as, for example, email applications, social networking applications, word processors, spreadsheets, and/or other applications.

Figure 2A:
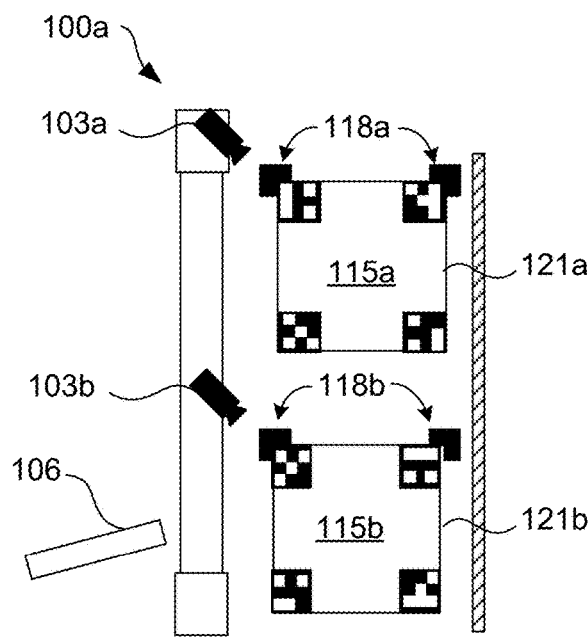
FIGS. 2A-2D illustrate examples of pallet placement systems according to various aspects of the embodiments of the present disclosure.

Turning to particular aspects of the embodiments, FIG. 2A shows an example pallet placement system 100a. The pallet placement system 100a is a representative example of the pallet placement system 100 shown in FIG. 1A and can include components of the networked environment 140 shown in FIG. 1B. The pallet placement system 100a can include cameras 103a and 103b, display device 106, pallet placement regions 115a and 115b, and corresponding backing bracket sets 118a and 118b. The pallet placement application 154 can use a camera 103a to monitor the pallet placement region 115a, and a separate camera 103b to monitor the pallet placement region 115b. The camera 103a can be configured so that during and after placement of a pallet in the pallet placement region 115a, at least two sides of the pallet are within a field of view of the camera 103a. Likewise, the camera 103b can be configured so that at least two sides of a pallet are within its field of view during and after placement of the pallet in the pallet placement region 115b.

A set of fiducials can be utilized to define or calibrate the pallet placement region 115a. For example, a sheet, card, or other calibration target 121a can be placed in a proper or expected location of the pallet placement region 115a within the field of view of the camera 103a. In some cases, the pallet calibration target 121a can be placed against the set of backing brackets 118a. The pallet calibration target 121a can include the set of fiducials. Once properly placed, a button or physical actuator of the pallet placement system 100a can be depressed or activated to initiate calibration of the pallet placement region 115a. The physical actuator can be located nearby or within the pallet buffer. The button can also refer to a user interface element that can be activated through a user interface 108. The pallet calibration target 121a can then be removed from the area.

Similarly, a calibration target 121b can be placed at a proper location of the pallet placement region 115b, within the field of view of the camera 103b. Once the pallet calibration target 121b is properly placed, a button or physical actuator of the pallet placement system 100a can be depressed or activated to initiate calibration of the pallet placement region 115b. The pallet calibration target 121b can then be removed from the area. The proper placement positions of pallet placement regions 115a and 115b can be designed based on operational parameters of an AGV. For example, calibration targets 121a and 121b can be designed based on fork length and location of load sensors for an AGV.

With the calibration process completed, the pallet placement application 154 can monitor the pallet placement regions 115a and 115b to detect pallet positions. The pallet placement application 154 can show detected pallet positions in a user interface 108 rendered for display by the display device 106, for example. The pallet placement system 100a can also provide corrective actions that describe and/or illustrate how to correct unacceptable placements.

Figure 2B:
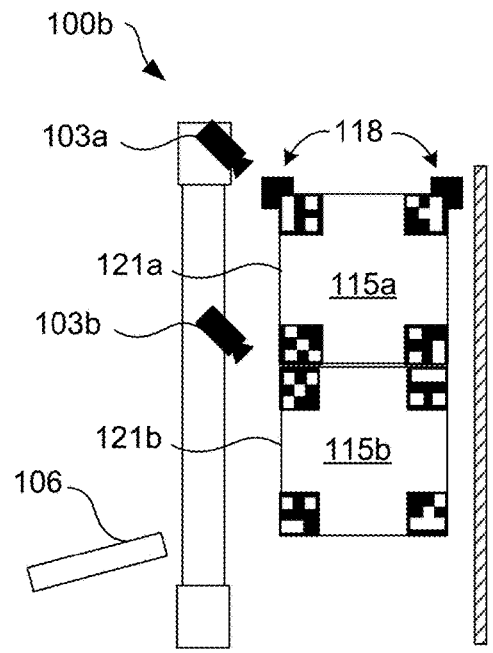

FIG. 2B shows an example pallet placement system 100b. The pallet placement system 100b is a representative example of the pallet placement system 100 shown in FIG. 1A and can include components of the networked environment 140 shown in FIG. 1B. The pallet placement system 100b can include cameras 103a and 103b, display device 106, and adjacent pallet placement regions 115a and 115b. However, the pallet placement system 100b is configured so that an AGV with long forks can simultaneously pick pallets within the adjacent pallet placement regions 115a and 115b. As a result, a single set of backing brackets 118 can be used for the adjacent pallet placement regions 115a and 115b. The adjacent pallet placement regions 115a and 115b can include adjacent sides that are touching or that are within a predetermined distance from one another.

The proper placement positions of pallet placement regions 115a and 115b can be designed based on operational parameters of an AGV. Calibration targets 121a and 121b, and the distance between adjacent pallet placement regions 115a and 115b, can be designed based on fork length and location of load sensors for the AGV. In some cases, the pallet calibration targets 121a and 121b can instead be a single calibration target with two sets of fiducials.

The pallet placement application 154 can use a camera 103a to monitor the pallet placement region 115a, and a separate camera 103b to monitor the pallet placement region 115b. The camera 103a can be configured so that, during and after placement of a pallet in the pallet placement region 115a, at least two sides of the pallet are within a field of view of the camera 103a. Likewise, the camera 103b can be configured so that at least two sides of a pallet are within its field of view during and after placement of the pallet in the pallet placement region 115b. The operation of the pallet placement system 100b can be otherwise similar to that described for FIG. 2A.

Figure 2C:
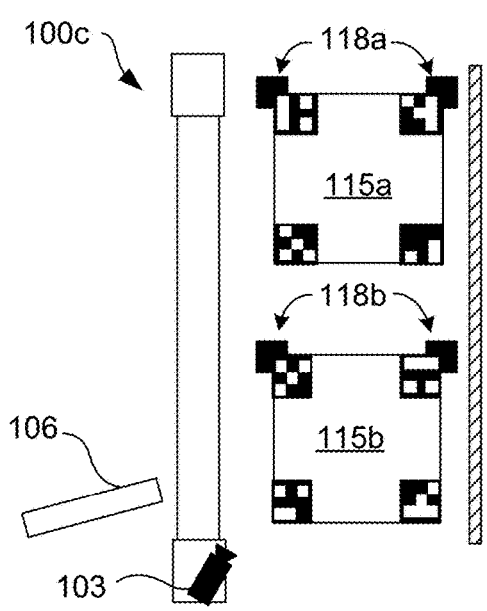

FIG. 2C shows a pallet placement system 100c. The pallet placement system 100c is a representative example of the pallet placement system 100 shown in FIG. 1A and can include components of the networked environment 140 shown in FIG. 1B. The pallet placement system 100*c* can include a camera 103, display device 106, pallet placement regions 115*a* and 115*b*, and corresponding backing bracket sets 118*a* and 118*b*. The pallet placement system 100*c* illustrates a configuration where two separate pallet placement regions 115*a* and 115*b* can be monitored using a single camera 103.

The camera 103 can be placed so that at least two sides of the pallet placement region 115*a* are within the field of view of the camera 103 during placement and after placement of a pallet within the pallet placement region 115*a*. In addition, the camera 103 can be located so that at least two sides of the pallet placement region 115*b* are within the field of view of the camera 103 during placement and after placement of a pallet within the pallet placement region 115*b*. For some locations of the camera 103, a pallet placed in the pallet placement region 115*b* can obstruct one side of the pallet placement region 115*a*. However, this can be acceptable if the workflow indicates that a pallet is to be placed within the pallet placement region 115*a* prior to a pallet being placed within the pallet placement region 115*b*.

Figure 2D:
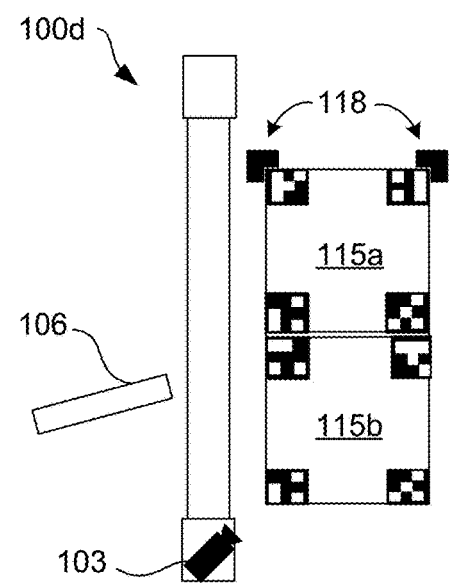

FIG. 2D shows an example pallet placement system 100*d*. The pallet placement system 100*d* is a representative example of the pallet placement system 100 shown in FIG. 1A and can include components of the networked environment 140 shown in FIG. 1B. The pallet placement system 100*d* can include a camera 103, a display device 106, and adjacent pallet placement regions 115*a* and 115*b*. Pallet placement system 100*d* is configured so that an AGV with long forks can simultaneously pick pallets within the adjacent pallet placement regions 115*a* and 115*b*. A single set of backing brackets 118 can be used for both pallet placement regions 115*a* and 115*b*. The pallet placement system 100*d* illustrates a configuration that utilizes a single camera 103 to monitor both of the adjacent pallet placement regions 115*a* and 115*b*.

The camera 103 can be placed so that at least two sides of the pallet placement region 115*a* are within the field of view of the camera 103 during placement and after placement of a pallet within the pallet placement region 115*a*. In addition, the camera 103 can be located so that at least two sides of the pallet placement region 115*b* are within the field of view of the camera 103 during placement and after placement of a pallet within the pallet placement region 115*b*.

For some locations of the camera 103, a pallet placed in the pallet placement region 115*b* can obstruct the pallet placement region 115*a* from the camera 103. However, this can be acceptable if the workflow indicates that a pallet is to be placed within the pallet placement region 115*a* prior to a pallet being placed within the pallet placement region 115*b*, or if the pallet placement regions 115*a* and 115*b* are placed concurrently by PIT equipment with long forks.

FIG. 3A shows an example user interface 108*a*. The user interface 108*a* is a representative example of the user interface 108 shown in FIG. 1A and generated by components of the networked environment 140 shown in FIG. 1B. The user interface 108*a* is a representative example interface that can be rendered for display on the display device 106 of the pallet placement system 100 in FIG. 1. The user interface 108*a* can include graphical representations of the set of backing brackets 118 and the pallet placement region 115. The user interface 108*a* can also include a detected pallet position 308. This can facilitate PIT equipment operators to efficiently and effectively place pallets 109 within the pallet placement region 115, for example.

The user interface 108*a* can also provide a corrective action to correct an unacceptable detected pallet position 308. The corrective action can include a graphical direction indicator 310 that indicates a direction to move the pallet 109 in order to correct the detected pallet position 308. The corrective action can also include a textual explanation 312 that describes how to perform the corrective action. In some cases, the corrective action can include a measurement such as a distance to move the pallet 109 in the direction shown by the graphical direction indicator 310.

In some cases, the detected pallet position 308 can be colored or shaded a particular color or shade that indicates unacceptable placement. Once the detected pallet position 308 is acceptable, the color or shade can be altered to indicate acceptable placement of the pallet 109. For example, the detected pallet position 308 can be red or a darker shade to indicate unacceptable placement, and can change to green or a brighter shade to indicate acceptable placement.

FIG. 3B shows an example user interface 108*b*. The user interface 108*b* is a representative example of the user interface 108 shown in FIG. 1A and generated by components of the networked environment 140 shown in FIG. 1B. The user interface 108*b* can be rendered for display on the display device 106. The user interface 108*b* can show graphical representations of the pallet placement region 115, backing brackets 118, detected pallet position 308, and a corrective action. In this case, the graphical direction indicator 310 indicates a direction to rotate the pallet 109 in order to correct an unacceptable detected pallet position 308. The corrective action can also include a textual explanation 312 that describes how to perform the corrective action. The corrective action can include a measurement such as a number of degrees to rotate the pallet 109 in the direction shown by the graphical direction indicator 310.

FIG. 3C shows an example user interface 108*c*. The user interface 108*c* is a representative example of the user interface 108 shown in FIG. 1A and generated by components of the networked environment 140 shown in FIG. 1B. The user interface 108*c* can show a pallet placement region 115 and backing brackets 118. The user interface 108*c* can include two detected pallet positions 308*a* and 308*b* for two pallets 109 that are detected within the pallet placement region 115. The user interface 108*c* can show a corrective action associated with a moving both pallets 109 in a direction shown by the graphical direction indicator 310, and explained using a textual explanation 312.

FIG. 3D shows an example user interface 108*d*. The user interface 108*d* is a representative example of the user interface 108 shown in FIG. 1A and generated by components of the networked environment 140 shown in FIG. 1B. The user interface 108*d* can show a pallet placement region 115 and backing brackets 118. The user interface 108*d* can show two detected pallet positions 308*a* and 308*b* for two pallets 109 that are detected within the pallet placement region 115.

The user interface 108*d* can indicate that the detected pallet position 308*a* is acceptable by coloring or shading the detected pallet position 308*a* in a color or shade associated with acceptable pallet placements. However, the detected pallet position 308*b* can remain colored or shaded to indicate unacceptable placement. The user interface 108*d* can include a corrective action for the detected pallet position 308*b*, indicating that a particular pallet 109 should be moved in a direction shown by the graphical direction indicator 310, as explained using a textual explanation 312.

FIG. 3E shows an example user interface 108e. The user interface 108e is a representative example of the user interface 108 shown in FIG. 1A and generated by components of the networked environment 140 shown in FIG. 1B. The user interface 108e can show a pallet placement region 115 and backing brackets 118. The pallet placement application 154 can detect that the pallet 109 indicated by detected pallet position 308 is a non-standard size, or is otherwise detect that a size of the pallet 109 is unacceptable for the pallet placement region 115. The textual explanation 312 of the corrective action can indicate that the pallet 109 should be removed from the pallet placement region 115. In some cases, the textual explanation 312 can also indicate an area, zone, buffer or location identifier for non-standard pallets, or a detected size of the pallet 109. The user interface 108e also shows that while colors and shades can be used to indicate unacceptable placement, an icon or pallet placement status indicator 315 can also be utilized.

FIG. 3F shows an example user interface 108f. The user interface 108f is a representative example of the user interface 108 shown in FIG. 1A and generated by components of the networked environment 140 shown in FIG. 1B. The user interface 108f can include a pallet placement region 115 and backing brackets 118. The user interface 108f shows that while colors and shades can be used to indicate that the pallet placement 308 is acceptable, an icon or pallet placement status indicator 315 can also be utilized to indicate acceptable pallet placement.

While the user interfaces 108 generated by the pallet placement application 154 can include graphical user interfaces 108, indicator lights and audio interfaces can also be relied upon. For example, a graphical direction indicator can alternatively be implemented using a set of direction indicator lights. The pallet placement application 154 can select and activate a direction indicator light to indicate a direction to move the pallet. A rotational indicator light can be activated to indicate a direction to rotate the pallet. The pallet placement application 154 can light a placement indicator light with a particular color, for example a red light or another color, to indicate that detected pallet placement is unacceptable. The pallet placement application 154 can light a placement indicator light with a different color, for example a green light, to indicate that detected pallet placement is acceptable.

The pallet placement application 154 can also provide audible queues through a speaker or other audio device. The audio device can be a standalone device or a portion of the client device 151. A particular tone, sound, or spoken instructions can indicate that the detected pallet placement is unacceptable. Another tone, sound, or audio instructions, including spoken-word instructions. can indicate that the detected pallet placement is acceptable. The pallet placement application 154 can select and produce audio instructions that indicate a direction and distance to move the pallet. The pallet placement application 154 can select and produce audio instructions that indicate a direction and number of degrees to rotate the pallet. For example, the pallet placement application 154 can identify a corrective action and a textual explanation as described above, and can process the textual explanation and produce audio instructions along with or instead of a graphical user interface.

Figure 4A:
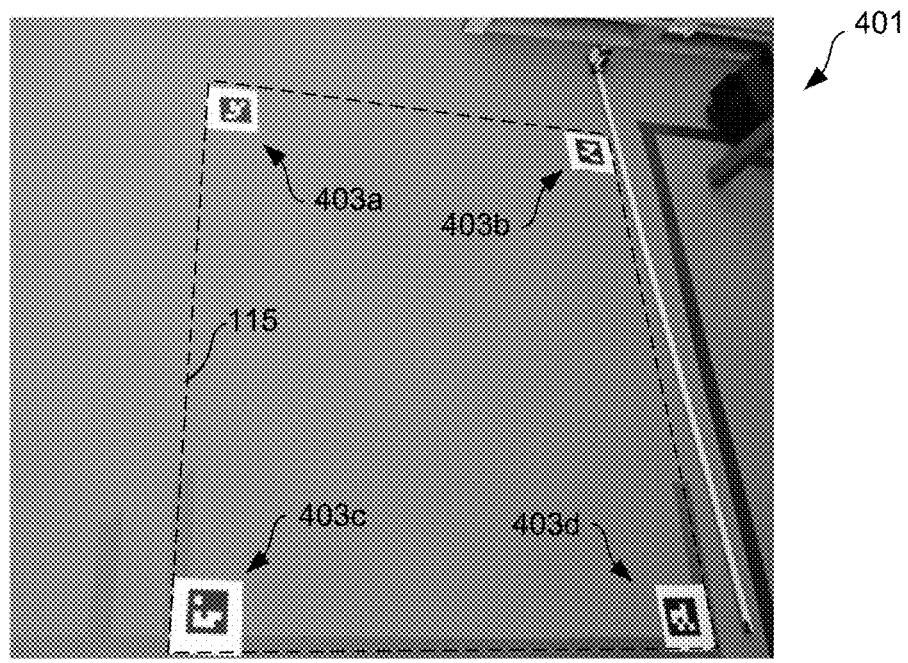
FIGS. 4A-4G illustrate aspects of image processing for a pallet placement system according to various aspects of the embodiments of the present disclosure.

FIGS. 4A-4G illustrate aspects of image processing conducted by the pallet placement application 154 shown in FIG. 1. FIG. 4A shows a field of view of a camera 103 and the image 401 captured within this field of view. Fiducials 403a-403d (the "fiducials 403") are placed in the pallet placement region 115. While the fiducials 403 are shown as separate items, the fiducials 403 can also be on a single calibration target 121. Each of the fiducials 403 can mark a respective corner of the pallet placement region 115.

The pallet placement application 154 of the computing environment 149 of the pallet placement system 100 can be initialized or calibrated with the information shown in FIG. 4A. For example, in a calibration process of the pallet placement application 154, the camera 103 can capture the image 401, including the fiducials 403. The computing environment 149 can store a copy of the image 401 as part of the image data 166. The pallet placement application 154 can use this information to define the pallet placement region 115 as a set of pixels or a particular area within the captured image 401. For example, a first pixel value can be associated with the fiducial 403a, a second pixel value can be associated with the fiducial 403b, a third pixel value can be associated with the fiducial 403c, and a fourth pixel value can be associated with the fiducial 403d. In some cases, calibration includes defining or redefining the pallet placement region 115, and determining a region of interest within the image 401. The region of interest can include the pallet placement region 115 and a buffer region around the pallet placement region 115. The buffer region can be a distance in each of the X and Y directions around the pallet placement region 115. The buffer region can allow detection of pallets 109 that are misplaced and not fully within the pallet placement region 115.

Figure 4B:
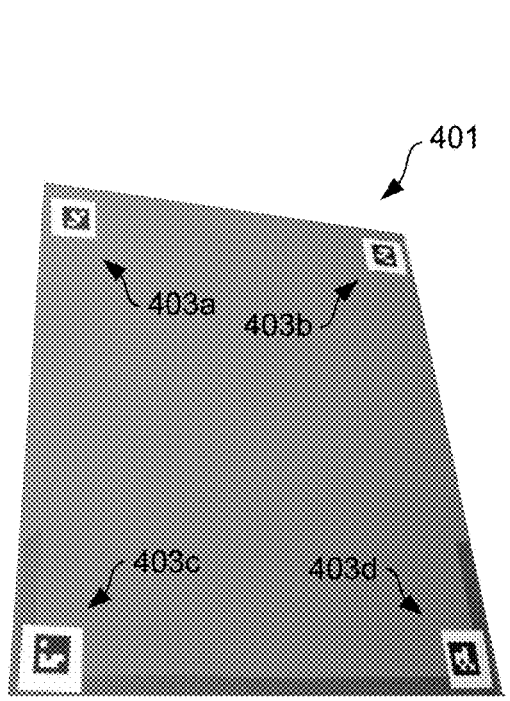

In FIG. 4B, the pallet placement application 154 can perform additional aspects of image processing. The image 401 can be converted to grayscale and cropped. The image 401 can be converted to grayscale in order to be compatible with image processing algorithms that utilize grayscale gradients. The image 401 can be cropped to a region of interest that includes the pallet placement region 115 as defined by the fiducials 403, and a buffer region around the pallet placement region 115. Cropping the image 401 can be used to reduce computational overhead and errors that can occur by processing an image area that is irrelevant to the pallet placement region 115.

Figure 4C:
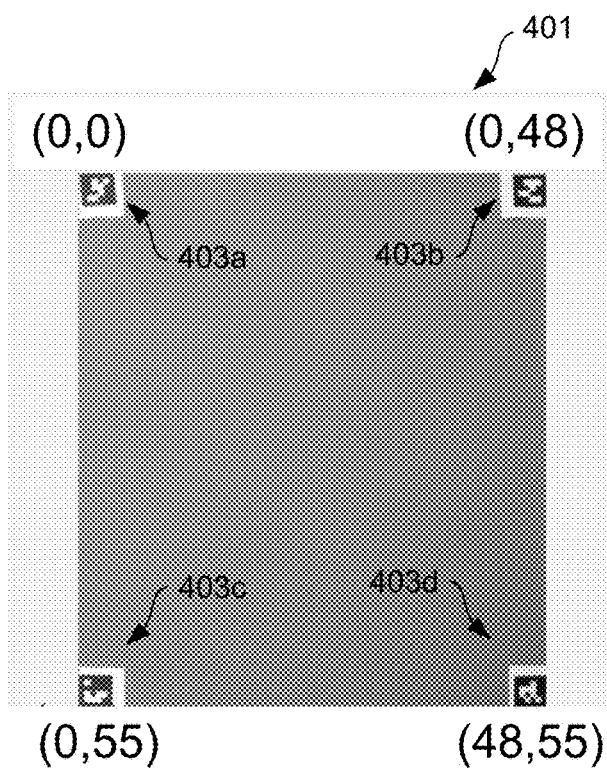

In FIG. 4C, the pallet placement application 154 can translate the image 401 to generate a top-down or bird's eye view of the pallet placement region 115. The pallet placement application 154 can utilize perspective translation such as inverse perspective mapping or another image translation technique. Perspective translation can include an algorithm that maps an initial plane to another plane. For example, the pallet placement system 100 can provide the image 401 as an input to a perspective translation algorithm 158 or matrix that maps an initial plane shown in the image 401 to another plane, in order to simulate a top-down view of the pallet placement region 115.

Once the image is translated, pixel positions for the corners of the pallet placement region 115 can be identified. For example, the fiducial 403c can be associated with a (0,0) pixel position, which defines X and Y coordinates for the fiducial 403c. The fiducial 403d can have (X,Y) coordinates (48,0). The fiducial 403a can have X,Y coordinates (0,55). The fiducial 403b can have X,Y coordinates (48,0). In some cases, the calibration process for a pallet placement region 115 can include translating the image 401 to generate a top-down view and defining top-down pixel coordinates for the fiducials 403 or corners of the pallet placement region 115. The buffer region can be defined as a predetermined number of pixels in the top-down view and converted back to pixel positions in a plane of the camera's natural field of view, using another perspective translation algorithm 158.

Figure 4D:
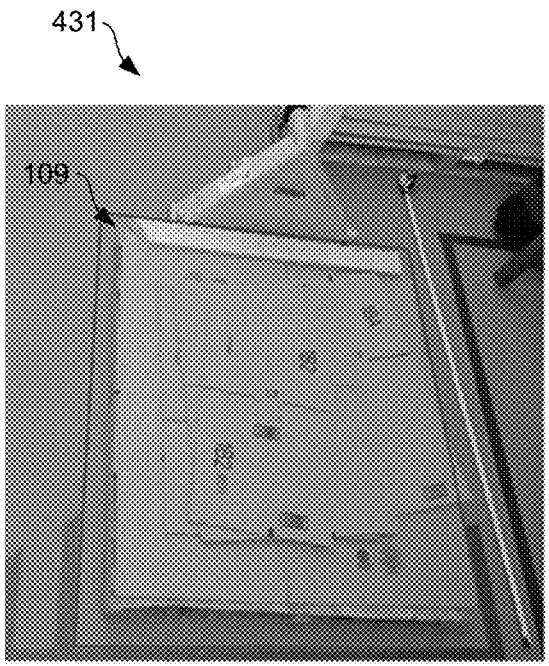

Moving to FIG. 4D, the pallet placement application 154 can begin monitoring the pallet placement region 115 for a detected pallet position. The fiducials 403 can be removed from the area. A pallet 109 can be placed, for example, using a forklift or other PIT equipment. In this case, the pallet 109 includes a number of broken-down boxes. An image 431 can be captured by the camera 103. The pallet placement application 154 can convert the image 431 to grayscale. In some cases, the image 431 is captured by the camera 103 as a grayscale image. The pallet placement application 154 can also crop the image 431 according to the region of interest defined during the calibration process.

Figure 4E:
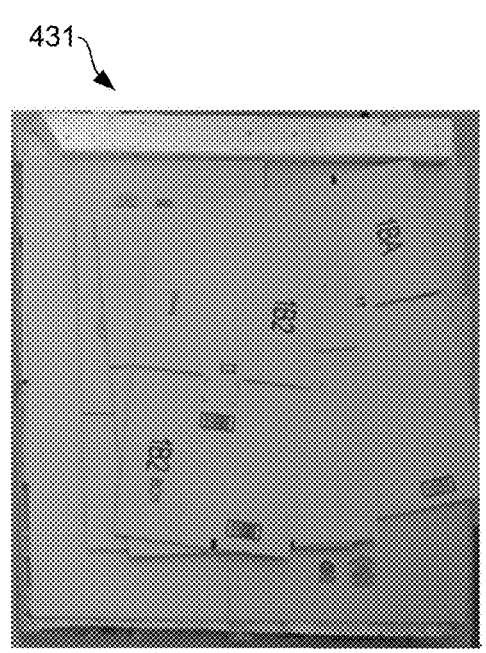

In FIG. 4E, the pallet placement application 154 can perform perspective translation on the image 431 or otherwise generate a top-down or bird's eye view of the pallet placement region 115. For example, the pallet placement application 154 can provide the image 431 as an input to a perspective translation algorithm 158 that maps an initial plane of the image 431 to another plane. The perspective-translated image 431 can simulate a top-down view of the pallet placement region 115 and the pallet 109.

Figure 4F:
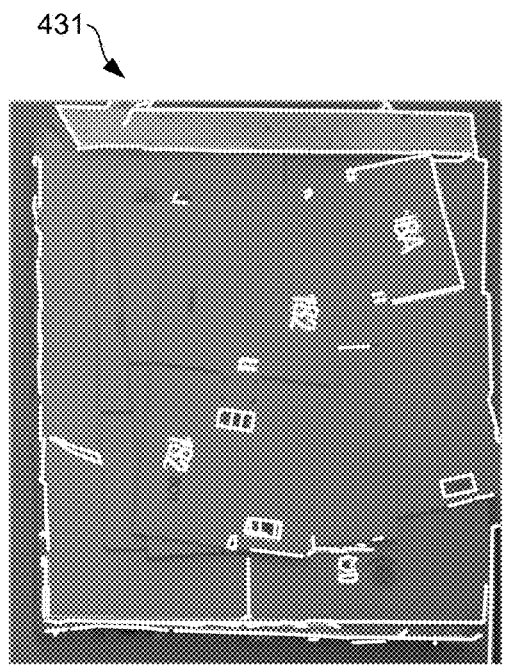

In FIG. 4F, the pallet placement application 154 can perform an edge detection on the perspective-translated image 431. For example, the pallet placement application 154 can provide the perspective-translated image 431 as an input to an edge detection algorithm 160. The edge detection algorithm 160 can include a canny edge detection algorithm or another edge detection algorithm 160. A canny edge detection algorithm can compute gradients within the grayscaled and perspective-translated image 431. Gradients greater than a predetermined threshold gradient value correspond to edges. A number of edges can be generated. The edges are shown as white lines in FIG. 4F. Edges that are shorter than a predetermined threshold can be filtered out.

Figure 4G:
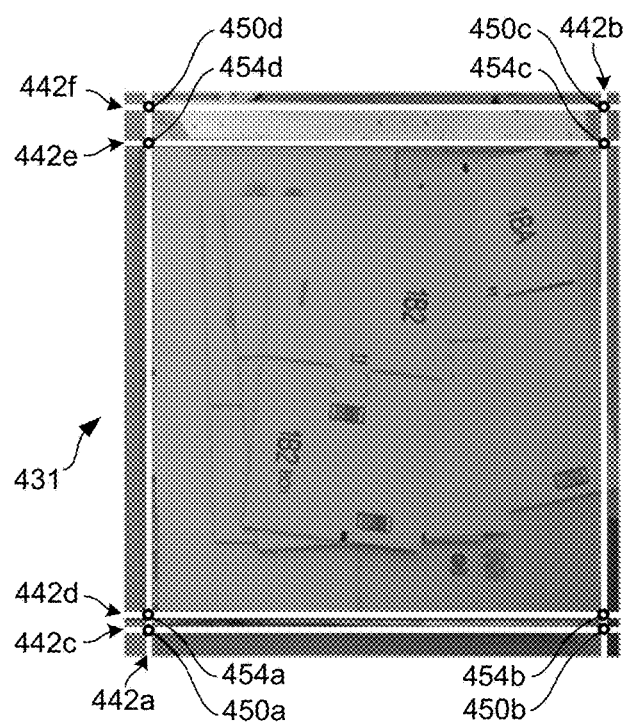

In FIG. 4G, the pallet placement application 154 can generate position lines 442a, 442b, 442c, 442d, 442e, and 442f (the "position lines 442"). The pallet placement application 154 can utilize a Hough transform or another line fitting or line generation algorithm 162 to generate the position lines 442 from the edges identified in the grayscaled and perspective-translated image 431. The pallet placement application 154 can, for each pixel (x,y), determine if there is evidence of a straight line defined by p=x cos Θy sin Θ at that pixel. If the edge or point lies on the line, a value can be incremented in association with the line. Lines with the highest values, or values above a predetermined threshold, can be extracted as the position lines 442. In some cases, the position lines can include lines that extend to an edge of the image or the region of interest.

The pallet placement application 154 can identify orthogonal intersections 450a, 450b, 450c, 450d, 454a, 454b, 454c, and 454d between the position lines 442. The pallet placement application 154 can then identify the largest area bound by the orthogonal intersections, and can determine a detected pallet position based on this area. In this figure, the orthogonal intersections 450a, 450b, 450c, and 450d define the largest area bound by the orthogonal intersections. The detected pallet position can be identified as the area bound by orthogonal intersections 450a, 450b, 450c, and 450d.

The pallet placement application 154 can identify a detected pallet position based on two or more position lines 442. This can be useful where the camera 103 is placed at an angle where the contents or items loaded on a pallet 109 obstruct the camera's view of some of the sides of the pallet 109 and the pallet placement region 115. For example, in some examples, the position lines 442 might include the position lines 442a, 442b and 442c, and exclude the others shown in the figure. The pallet placement application 154 can identify the outermost orthogonal intersection 450a, or the intersection that is nearest to a boundary of the image 431 or region of interest. The detected pallet position can be determined using an expected size of the pallet 109, the orthogonal intersection 450a, and a calculated pallet angle. The pallet angle can be determined by computing an angular difference between the position line 442a compared to the vertical boundary of the pallet placement region 115, or an angular difference between the position line 442c and the horizontal boundary of the placement region 115.

A scale of the perspective-translated image 431 can be determined and stored for reference. For example, the pallet placement application 154 can determine a scale of the top-down view of the pallet placement region based at least in part on predefined distances between the plurality of fiducials that define corners of the pallet placement region 115. A rectangular detected pallet position can be generated as a pallet of the expected size having one corner placed at the orthogonal intersection 450a, and extending to the expected pallet size. The rectangular detected pallet position can be rotated using the detected pallet angle. The pallet placement application 154 can identify many preliminary position lines 442 that are later narrowed to a subset that are associated with the largest bound area or outermost orthogonal intersections, and are utilized to generate the detected pallet position.

Figure 5:
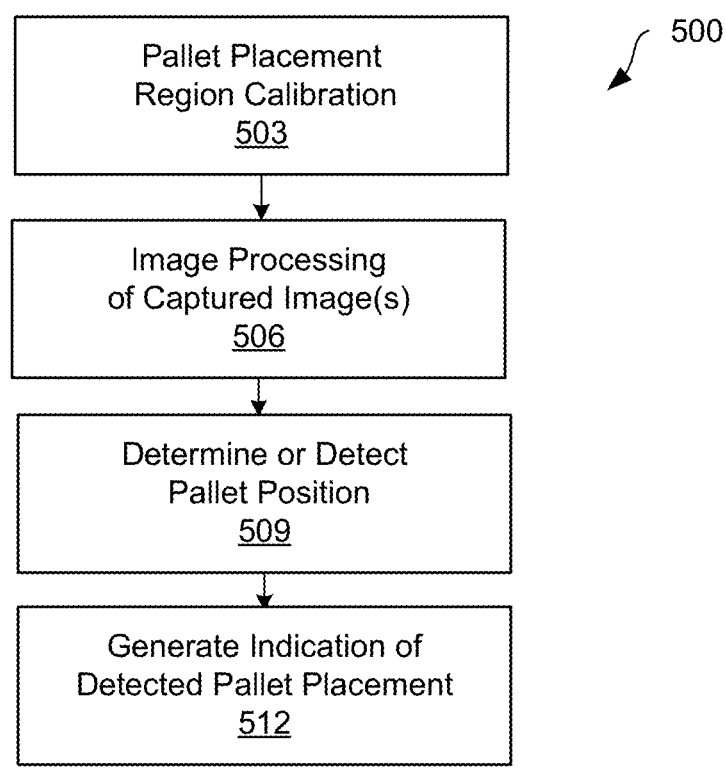
FIG. 5 is a flowchart that illustrates functionalities performed by a pallet placement system according to various aspects of the embodiments of the present disclosure.

FIG. 5 illustrates an example flowchart 500 for camera-based pallet placement detection and notification, according to various embodiments of the present disclosure. Flowchart 500 shows an overview of functionalities that can be performed using the pallet placement application 154.

At step 503, the pallet placement application 154 can perform pallet placement region calibration. The calibration can include initial definition or position of a pallet placement region 115 or a reset or recalibration of the pallet placement region 115. The calibration process can also include determining a region of interest in a field of view of a camera 103. The region of interest can include the pallet placement region 115 and a buffer region around the region of interest.

The pallet placement region 115 can be calibrated or recalibrated by placing a pallet calibration target 121 in an expected position or pickup position for an AGV. The pallet placement region 115 can be designed and located based on operational parameters of an AGV configured to pick or retrieve a pallet 109 once placed appropriately within the pallet placement region 115. The pallet calibration target 121 can be designed to fit precisely within a set of backing brackets 118. The set of backing brackets 118 can include a permanent or semi-permanent fixture within a pallet buffer. Once the pallet calibration target 121 is placed, a physical actuator or button 124 of the pallet placement application 154 can be depressed or activated. A camera 103 can capture an image such as a frame of a video that includes the pallet calibration target 121 within its field of view. The pallet placement region 115 can be identified using the fiducials of the pallet calibration target 121. A region of interest can include the pallet placement region 115 and a buffer region around the pallet placement region 115.

In step 506, the pallet placement application 154 can perform image processing on an image captured by the camera 103. The image can be captured as a still image or a frame of a video. The image can be captured during or after placement of a pallet 109 using PIT equipment. The pallet placement application 154 can crop the image to the region of interest identified in step 503, convert the image to grayscale, and perform perspective translation mapping to generate a top-down view of the pallet 109 and the pallet placement region 115.

In step 509, the pallet placement application 154 can determine a detected pallet position. For example, the pallet placement application 154 can perform edge detection to identify edges within a top-down version of the captured image, generate preliminary pallet lines based on these edges, and identify orthogonal intersections between the preliminary pallet lines. The detected pallet position can be generated or identified based on one or more of the orthogonal intersections. For example, detected pallet position can be the largest area that can be bound by the orthogonal intersections.

Alternatively, the outermost orthogonal intersection can be identified as the orthogonal intersection that is closest to a boundary of the region of interest or cropped image. The detected pallet position can be generated based on an expected pallet size, the outermost orthogonal intersection, and the preliminary pallet lines that intersect at the outermost orthogonal intersection. For example, the pallet 109 of the expected size can be detected as being placed with one corner at the outermost orthogonal intersection and extending in the direction of the preliminary pallet lines.

In other examples, the pallet placement application 154 can determine a detected pallet position using machine learning algorithms or neural networks such as a convolutional neural network (CNN) or another machine learning algorithm to analyze the visual data top-down view of the pallet 109 and the pallet placement region 115. The machine learning algorithm can also generate lines that come together to identify at least one orthogonal intersection representing at least one corner and at least two sides of the pallet within the image. As a result, the line generation algorithm 162 can include a machine learning algorithm that generates the preliminary and/or final placement lines. In some cases, such a machine learning algorithm can also identify orthogonal intersections between the placement lines.

In step 512, the pallet placement application 154 can generate an indication of the detected pallet position relative to the pallet placement region 115. For example, the pallet placement application 154 can generate a user interface based on the detected pallet position. For example, the user interface can include the detected pallet position superimposed on an image of the pallet placement region 115, a video of pallet placement region 115, or a simulated representation of the pallet placement region 115. The user interface can also show a set of backing brackets 118, lane lines, and other aspects of the pallet buffer area for reference purposes. The user interface can also indicate whether the detected pallet position is acceptable or unacceptable. Where the detected pallet position is unacceptable, the user interface can include a corrective action that shows and describes how to correct the placement of the pallet 109. While the user interface can include a graphical user interface generated for display, the user interface can also include indicator light instructions, directional light instructions, tone based audio queues, spoken audio instructions, and other user interface types.

Figure 6:
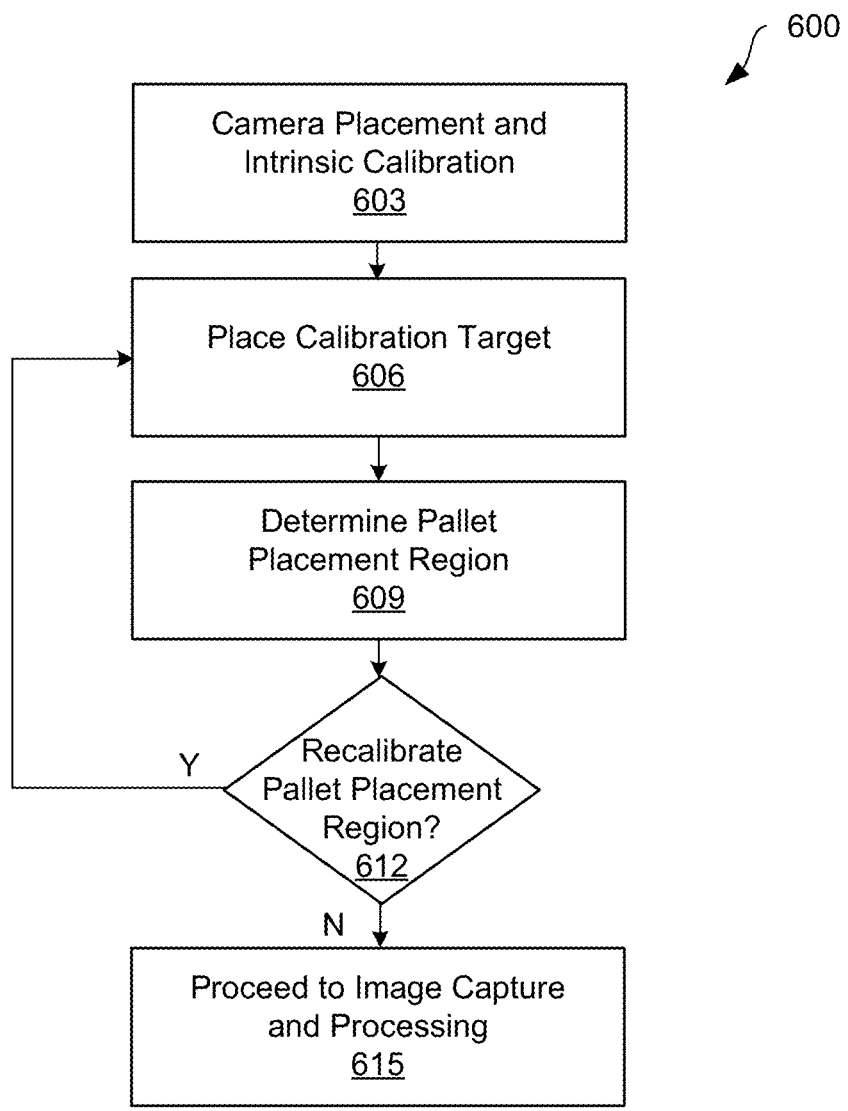
FIG. 6 is a flowchart that illustrates additional functionalities performed by a pallet placement system according to various aspects of the embodiments of the present disclosure.

FIG. 6 illustrates an example flowchart 600 for camera-based pallet placement detection and notification, according to various embodiments of the present disclosure. Flowchart 600 describes how the pallet placement application 154 can calibrate and recalibrate a pallet placement region 115 to be monitored for pallet placements.

In step 603, initial camera placement and intrinsic calibration of a camera 103 can be performed for the pallet placement application 154. The camera 103 can be mounted and directed with its field of view facing a location within a pallet buffer, such as a set of backing brackets 118. The backing brackets 118 can identify a pallet drop zone where a PIT equipment operator can place a pallet 109 for storage and eventual pickup using an AGV. The camera 103 can be mounted on a railing of a pallet buffer, on a ceiling of a facility, on a free standing camera mount, or in another configuration. Intrinsic calibration of the camera 103 can include estimation of optical center and focal length of the camera 103, as well as other camera parameters that can be used to correct for lens distortion. The images captured by the calibrated camera 103 can be used to measure the size of objects such as the pallet 109 and pallet placement region 115 within its field of view.

In step 606, a pallet calibration target 121 or a set of fiducials can be placed for the pallet placement application 154. The pallet calibration target 121 can be designed to be easily stored and quickly deployed for calibration of the pallet placement application 154. For example, the pallet calibration target 121 can be designed to fit precisely against a set of backing brackets 118 to ensure accurate placement. In other cases, the pallet calibration target 121 can include a cutout that secures around the set of backing brackets 118.

In step 609, the pallet placement application 154 can identify a pallet placement region 115 and a region of interest to monitor for the pallet placement region 115. The pallet placement application 154 can be initialized or calibrated using the pallet calibration target 121. The camera 103 can capture an image such as a frame of a video that includes the fiducials of the pallet calibration target 121. The pallet placement application 154 can define a position of the pallet placement region 115 as a set of pixels or a particular area within the captured image 401. For example, a pixel value can be associated with a respective one of the fiducials of the pallet calibration target 121.

The pallet placement application 154 can also determine a region of interest to monitor for the pallet placement region 115. The region of interest can include the pallet placement region 115 and a buffer region that extends the pallet placement region 115 by a predetermined percentage, distance, or number of pixels. The pallet placement application 154 can maintain a record of both the pallet placement region 115 and its region of interest.

In step 612, the pallet placement application 154 can determine whether to recalibrate the pallet placement region 115. For example, the pallet placement application 154 can determine to recalibrate the pallet placement region 115 based on manual activation of a recalibration button. Alternatively, the pallet placement application 154 can automatically determine to recalibrate the pallet placement region 115. For example, the pallet placement application 154 can identify that a current field of view of the camera 103 differs from an expected field of view. The pallet placement application 154 can also determine to recalibrate the pallet placement region 115 in response to detecting that the camera 103 has been shaken or moved.

If the pallet placement region 115 is to be recalibrated, the process can proceed to step 606, and the calibration target 121 can be again placed for calibration. In some cases, the process can proceed to step 603 and the camera 103 can be repositioned to correct its field of view. Otherwise, the process can proceed to step 615, which includes image capture and processing. These aspects of the placement system 100 are described in further detail with respect to FIG. 7.

Figure 7:
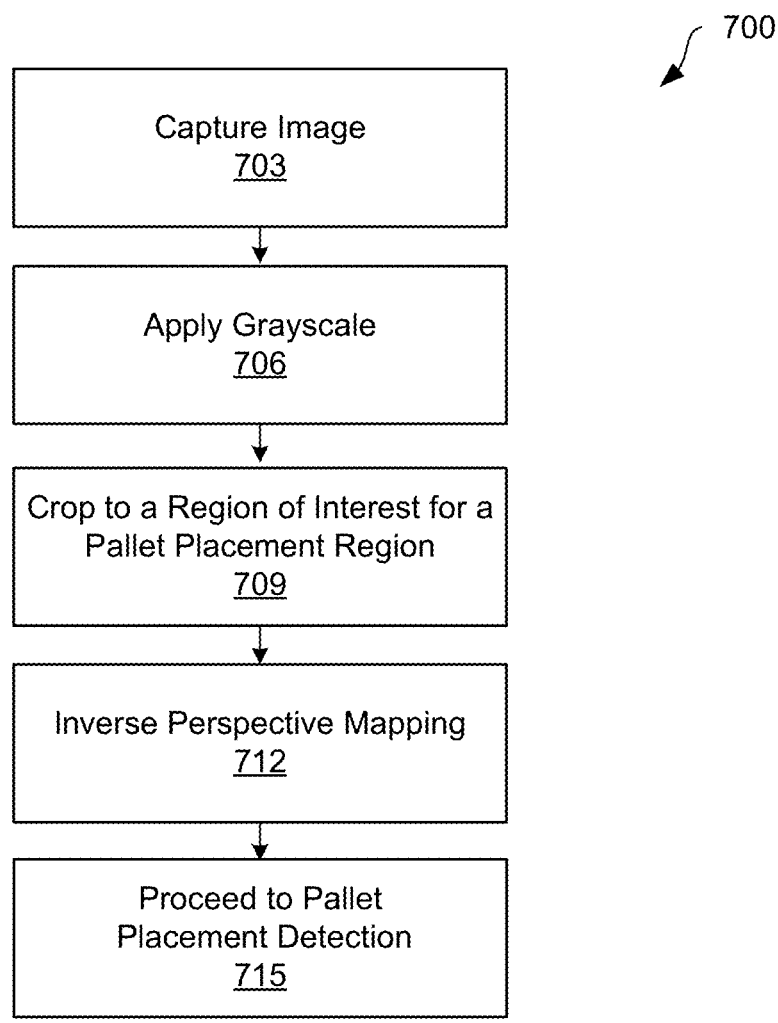
FIG. 7 is a flowchart that illustrates additional functionalities performed by a pallet placement system according to various aspects of the embodiments of the present disclosure.

FIG. 7 illustrates an example flowchart 700 for camera-based pallet placement detection and notification, according to various embodiments of the present disclosure. Flowchart 700 describes image processing for images captured by the pallet placement application 154 for monitoring a pallet placement region 115.

In step 703, the pallet placement application 154 can capture an image using a camera 103. The pallet placement application 154 can monitor a region of interest for the pallet placement region 115. The calibration and identification of the region of interest is discussed with respect to FIG. 6. In order to monitor the region of interest for the pallet placement region 115, the pallet placement application 154 can capture and process an image that includes a pallet placement region 115.

In step 706, the pallet placement application 154 can convert the image to grayscale. Alternatively, the camera 103 can initially capture the image as a grayscale image. The image can be converted to grayscale in order to facilitate edge detection and other processing steps associated with detecting pallet placement within the image.

In step 709, the pallet placement application 154 can crop the image to the region of interest for the pallet placement region. The image can be cropped to a region of interest that includes the pallet placement region 115 as well as a buffer region around the pallet placement region 115. Cropping the image can reduce computational overhead and errors that can occur by processing an image area that is irrelevant to the pallet placement region 115. The cropped image can result in reduced noise and reduced processing of extraneous information.

In step 712, the pallet placement application 154 can perform inverse perspective mapping or another perspective translation of the cropped image. The perspective translation can include an algorithm that maps an initial plane to another plane. The pallet placement application 154 can provide the image as an input to a perspective translation algorithm 158. The perspective translation algorithm 158 can output a translated image that simulates a top-down or bird's eye view of the cropped image, including the pallet placement region 115.

In step 715, the pallet placement application 154 can proceed to pallet placement detection. Aspects of pallet placement detection are described in further detail with respect to FIG. 8.

Figure 8:
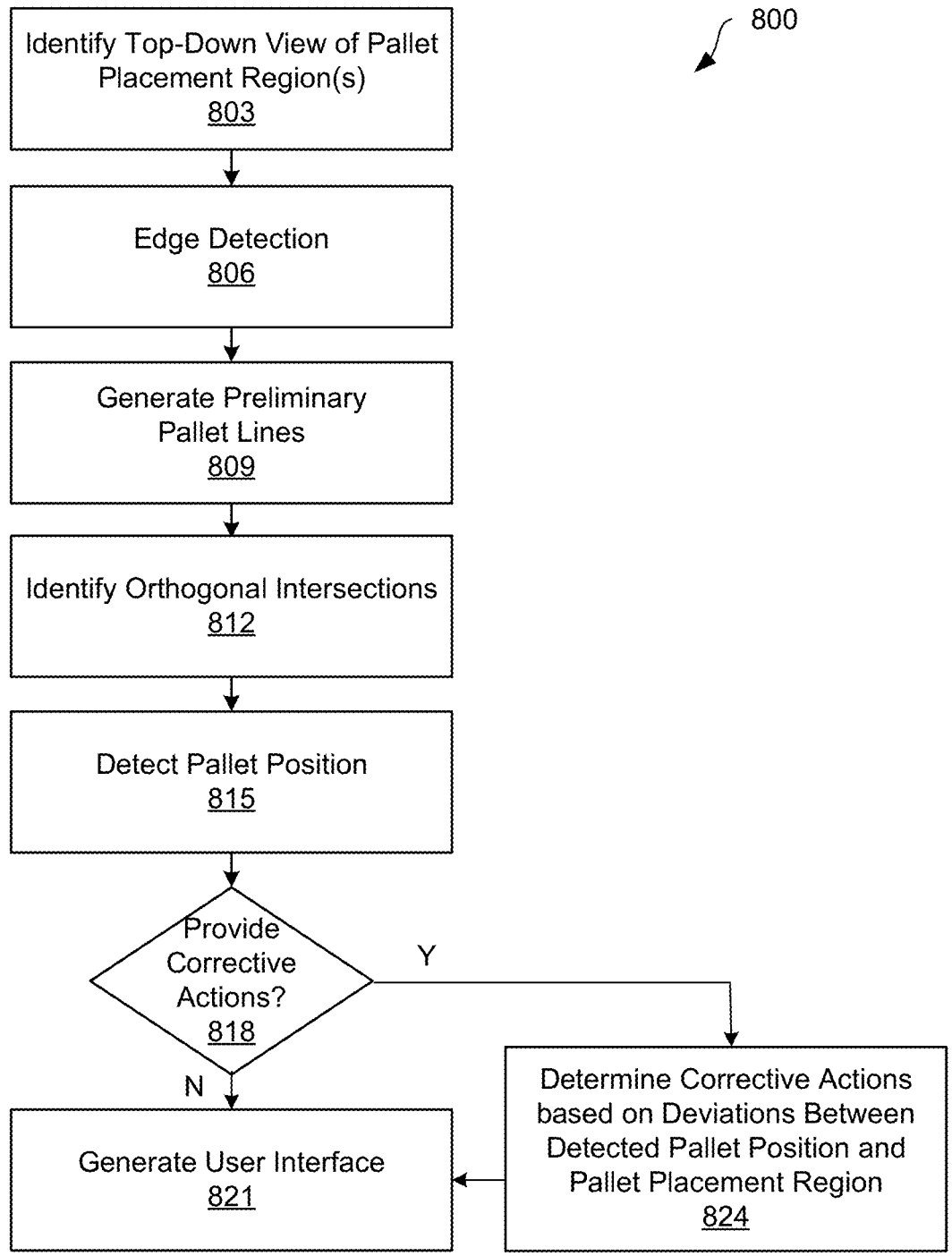
FIG. 8 is a flowchart that illustrates additional functionalities performed by a pallet placement system according to various aspects of the embodiments of the present disclosure.

FIG. 8 illustrates an example flowchart 800 for camera-based pallet placement detection and notification, according to various embodiments of the present disclosure. Flowchart 800 describes how the pallet placement application 154 detects placement of a pallet 109 with respect to a pallet placement region 115.

In step 803, the pallet placement application 154 can identify or generate a top-down view of the pallet placement region 115. An image can be captured during or after placement of a pallet 109. The pallet placement application 154 can crop the image to a predetermined or calibrated region of interest, convert the image to grayscale, and perform perspective translation mapping to generate a top-down or perspective-translated image of the pallet 109 and the pallet placement region 115.

In step 806, the pallet placement application 154 can perform edge detection on the top-down or perspective-transformed image of the pallet placement region 115. For example, the pallet placement application 154 can provide the perspective-translated image as an input to an edge detection algorithm 160. The edge detection algorithm 160 can compute gradients within the perspective-translated image. Gradients greater than a predetermined threshold gradient value correspond to edges. The edge detection algorithm 160 can identify a number of edges within the perspective-translated image. Edges that are shorter than a predetermined threshold can be filtered out.

In step 809, the pallet placement application 154 can generate position lines. For example, the pallet placement application 154 can utilize a line fitting or line generation algorithm 162 to generate the position lines based on the perspective-translated image and the identified edges. For example, the pallet placement application 154 can aggregate the edges that are within a threshold distance from one another, and edges that are aligned within a threshold angle. The aggregated edges can form position lines.

In step 812, the pallet placement application 154 can identify orthogonal intersections between the position lines. The orthogonal intersections are useful because the pallet 109 can be expected to include orthogonal corners, so the orthogonal intersections of position lines can include the corners of the pallet 109.

In step 815, the pallet placement application 154 can detect pallet position. In some cases, all four corners of the pallet 109 can be identified. For example, the pallet placement application 154 can identify one or more areas bound by the orthogonal intersections that are identified in step 812. The pallet placement application 154 can determine a detected pallet position based on the largest bound area defined by the orthogonal intersections. In some cases, the largest bound area is only accepted as a detected pallet position if it is greater than a predetermined threshold.

However, depending on the mounting position of the camera 103, objects on the pallet 109 can obstruct some of the corners of the pallet 109. In this situation, as few as two pallet placement lines can be used to generate the detected pallet position. For example, the pallet placement application 154 can identify a detected pallet position based on an expected pallet size, the outermost orthogonal intersection, and the preliminary pallet lines that intersect at the outermost orthogonal intersection. The detected pallet position can include one corner at the outermost orthogonal intersection and extend to the expected pallet size in the directions of the preliminary pallet lines.

The pallet placement lines can also be mirrored, because the pallet can be expected to be rectangular in outline. For example, a mirrored pallet placement line can be parallel to a detected pallet placement line, and placed a distance apart from the detected pallet placement line based on the expected size of the pallet in that direction. In some cases, the expected pallet size is not needed. The pallet placement application 154 can identify an extent of the detected pallet placement lines. The pallet placement application 154 can detect a first pallet placement line and its dimensions or extent. The pallet placement application 154 can also detect a second pallet placement line and its dimensions or extent. The first and second pallet placement lines can intersect at an orthogonal intersection. The pallet placement application 154 can mirror the first pallet placement line by placing it at an end of the second pallet placement line opposite from the orthogonal intersection. The pallet placement application 154 can also mirror the second pallet placement line by placing it at an end of the first pallet placement line opposite from the orthogonal intersection.

In step 818, the pallet placement application 154 can determine whether to provide corrective actions within its user interface. If no corrective actions will be provided, the pallet placement application 154 can proceed to step 821.

However, if corrective actions are to be provided, the pallet placement application 154 can proceed to step 824.

In step 821, the pallet placement application 154 can generate a user interface. The user interface can be generated and rendered for display on the display device 106. The user interface can include the detected pallet position overlaid on an image of the pallet placement region 115, a video of pallet placement region 115, or a simulated representation of the pallet placement region 115. The user interface can also show a set of backing brackets 118, lane lines, and other aspects of the pallet buffer area for reference purposes. The user interface can also indicate whether the detected pallet position is acceptable or unacceptable. In some cases, the user interface can include a corrective action that shows and describes how to correct the placement of the pallet 109.

In step 824, the pallet placement application 154 can identify deviations between the detected pallet position and the pallet placement region 115. For example, the pallet placement application 154 can determine a horizontal distance between a vertical boundary of the pallet placement region 115 and a vertical side of the detected pallet position. The pallet placement application 154 can determine a horizontal distance to move the pallet 109 based on the horizontal distance between the vertical boundary of the pallet placement region 115 and the vertical side of the detected pallet position. Likewise, the pallet placement application 154 can determine a vertical distance between a horizontal boundary of the pallet placement region 115 and a horizontal side of the detected pallet position. The pallet placement application 154 can determine a vertical distance to move the pallet 109 based on the vertical distance between the horizontal boundary of the pallet placement region 115 and the horizontal side of the detected pallet position. A scale of the perspective-translated image can be determined and stored for reference. The pallet placement application 154 can identify specific distances to move the pallet 109 based on the detected deviations and the scale of the perspective-translated image.

The pallet placement application 154 can also determine an angular deviation or pallet angle between the pallet placement region 115 and the detected pallet position. For example, the angular deviation can be determined by computing an angular difference between a particular side of the detected pallet position and a boundary of the pallet placement region 115.

The pallet placement application 154 can also store plain speech descriptions of how to perform corrective actions, such as instructions to rotate a pallet, move a pallet, remove a pallet, and close a gap between pallets. In some cases, the instructions can make reference to fixtures within the pallet buffer such as a position of the backing brackets 118. The pallet placement application 154 can identify the plain speech descriptions based on the deviations between the detected pallet position and the pallet placement region 115. The pallet placement application 154 can also identify graphics, such graphical direction indicators based on the deviations between the detected pallet position and the pallet placement region 115. The pallet placement application 154 can then move to step 821 and include a corrective action within the user interface.

Figure 9:
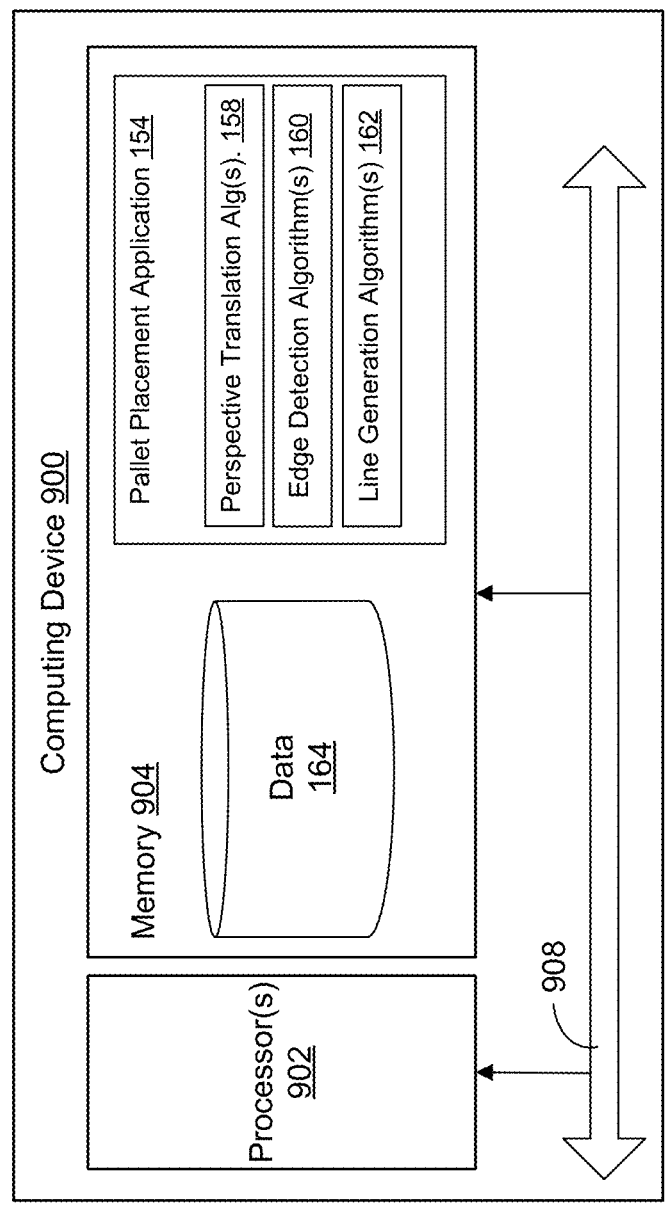
FIG. 9 illustrates an example computing device for a pallet placement system according to various aspects of the embodiments of the present disclosure.

As shown in FIG. 9, the computing device 900 includes at least one processing system, for example, having a processor 902 and a memory 904, both of which are electrically and communicatively coupled to a local interface 908. The local interface 908 can be embodied as a data bus with an accompanying address/control bus or other addressing, control, and/or command lines, for data communications and addressing between the processor 902, the memory 904, and the pallet placement application 154.

In various embodiments, the memory 904 stores data 906 and other software or executable-code components executable by the processor 902. The data 906 can include data related to the operation of the pallet placement system 100, and other data. Among others, the executable-code components can include components associated with the pallet placement application 154 and an operating system for execution by the processor 902. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 904 stores software for execution by the processor 902. In this respect, the terms "executable" or "for execution" refer to software forms that can ultimately be run or executed by the processor 902, whether in source, object, machine, or other form. Examples of executable programs include, for example, a compiled program that can be translated into a machine code format and loaded into a random access portion of the memory 904 and executed by the processor 902, source code that can be expressed in an object code format and loaded into a random access portion of the memory 904 and executed by the processor 902, or source code that can be interpreted by another executable program to generate instructions in a random access portion of the memory 904 and executed by the processor 902, etc.

In various embodiments, the memory 904 can include both volatile and nonvolatile memory and data storage components. Volatile components are those that do not retain data values upon loss of power. Nonvolatile components are those that retain data upon a loss of power. Thus, the memory 904 can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 904.

The processor 902 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the pallet placement application 154 can represent one or more module or group of code that includes program instructions to implement the specified logical function(s) discussed herein. The program instructions can be embodied in the form of source code that includes human-readable statements written in a programming language or machine code that includes machine instructions recognizable by a suitable execution system, such as a processor in a computer system or other system. Thus, the processor 902 can be directed by execution of the program instructions to perform certain processes, such as those illustrated in the flowcharts described herein. In the context of the present disclosure, a non-transitory computer-readable medium can be any non-transitory tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 902. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowcharts or process diagrams of FIGS. 5-8 can be representative of certain methods or processes, functionalities, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 902. The machine code can be converted from the source code, etc. Further, each block can represent, or be connected with, a circuit or a number of interconnected circuits to implement a certain logical function or process step.

Although the flowcharts illustrate a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. In other words, the embodiments described herein are not limited to the specifically described embodiments. The features of the embodiments described herein are representative and, in alternative embodiments, certain features and elements may be added or omitted.

Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A pallet placement detection and notification system, the system comprising:
    a camera device;
    a display device;
    at least one computing device configured to execute computer-readable instructions that, when executed, cause the at least one computing device to at least:
        capture, using the camera device, an image comprising a pallet placement region;
        generate a perspective translated image comprising a top-down view of the pallet placement region based at least in part on the image using a perspective translation algorithm;
        identify a plurality of image edges based at least in part on the perspective translated image using an edge detection algorithm;
        generate a plurality of position lines based at least in part on the image edges using a line generation algorithm;
        identify at least one orthogonal intersection between the plurality of position lines identified within the perspective translated image;
        determine a detected pallet position based at least in part on the at least one orthogonal intersection and the plurality of position lines; and
        generate a user interface for display on the display device, the user interface comprising a graphical representation of the pallet placement region and the detected pallet position.

2. The system of claim 1, wherein the edge detection algorithm computes at least one gradient of a grayscale version of the image, and a respective one of the image edges corresponds to a gradient value that exceeds a threshold value.

3. The system of claim 1, wherein the line generation algorithm comprises a Hough transform.

4. The system of claim 1, wherein the instructions further cause the at least one computing device to at least:
    calibrate a position of the pallet placement region based at least in part on a plurality of fiducials detected in the image, wherein the plurality of fiducials define corners of the pallet placement region.

5. A method for pallet placement detection and notification, the method comprising:
    generating a perspective translated image comprising a top-down view of a pallet placement region using a perspective translation algorithm;
    identifying at least one orthogonal intersection between a plurality of position lines identified within the perspective translated image;
    determining a detected pallet position of a pallet based at least in part on the at least one orthogonal intersection and the plurality of position lines; and
    generating an indication of the detected pallet position relative to the pallet placement region.

6. The method of claim 5, further comprising:
    identifying at least one deviation between the detected pallet position and the pallet placement region; and
    determining a corrective action to reduce the at least one deviation between the detected pallet position and the pallet placement region, wherein the indication is representative of the corrective action.

7. The method of claim 6, wherein the corrective action comprises a measurement of a distance to move the pallet.

8. The method of claim 6, wherein the corrective action comprises a measurement of an angle to rotate the pallet.

9. The method of claim 6, wherein the corrective action indicates a direction to move or rotate the pallet.

10. The method of claim 6, wherein the corrective action comprises a textual or audio explanation of how to perform the corrective action.

11. The method of claim 5, further comprising:
determining a scale of the perspective translated image based at least in part on predefined distances between a plurality of fiducials detected in the image.

12. The method of claim 5, wherein the detected pallet position is determined based at least in part on a largest area bound by the at least one orthogonal intersection between the plurality of position lines.

13. The method of claim 5, wherein the detected pallet position is determined based at least in part on an outermost orthogonal intersection of the at least one orthogonal intersection, and a subset of the plurality of position lines that form the outermost orthogonal intersection.

14. The method of claim 5, further comprising:
identifying a plurality of image edges based at least in part on the perspective translated image using an edge detection algorithm; and
generating the plurality of position lines based at least in part on the image edges using a line generation algorithm.

15. The method of claim 14, wherein the line generation algorithm comprises a Hough transform.

16. A non-transitory computer readable medium comprising instructions executable by at least one computing device, the instructions, when executed by the at least one computing device, causing the at least one computing device to at least:
capture, using a camera device, an image comprising a pallet placement region;
identify at least one orthogonal intersection between a plurality of position lines identified based at least in part on the image;
determine a detected pallet position of a pallet based at least in part on the at least one orthogonal intersection and the plurality of position lines; and
generate a user interface comprising an indication of the detected pallet position relative to the pallet placement region.

17. The non-transitory computer readable medium of claim 16, wherein the instructions further cause the at least one computing device to at least:
identify that the pallet placement region requires calibration; and
calibrate the pallet placement region based at least in part on a calibration target comprising a plurality of fiducials that define corners of the pallet placement region.

18. The non-transitory computer readable medium of claim 17,
wherein the pallet placement region is identified to require calibration based at least in part on a user input.

19. The non-transitory computer readable medium of claim 16, wherein the instructions further cause the at least one computing device to at least:
identify at least one deviation between the detected pallet position and the pallet placement region; and
determine a corrective action to reduce the at least one deviation between the detected pallet position and the pallet placement region, wherein the user interface further indicates the corrective action.

20. The non-transitory computer readable medium of claim 19, wherein the corrective action indicates a direction to move or rotate the pallet.

* * * * *